(12) United States Patent
Pak

(10) Patent No.: US 11,509,018 B2
(45) Date of Patent: Nov. 22, 2022

(54) BATTERY PACKAGE INCLUDING FIXING MEMBER, A DEVICE INCLUDING THE SAME AND MANUFACTURING METHOD OF BATTERY PACKAGE

(71) Applicant: LG Chem, Ltd., Seoul (KR)

(72) Inventor: Jeong In Pak, Daejeon (KR)

(73) Assignee: LG Energy Solution, Ltd.

( * ) Notice: Subject to any disclaimer, the term of this patent is extended or adjusted under 35 U.S.C. 154(b) by 106 days.

(21) Appl. No.: 16/976,574

(22) PCT Filed: Aug. 22, 2019

(86) PCT No.: PCT/KR2019/010705
§ 371 (c)(1),
(2) Date: Aug. 28, 2020

(87) PCT Pub. No.: WO2020/060047
PCT Pub. Date: Mar. 26, 2020

(65) Prior Publication Data
US 2021/0050567 A1 Feb. 18, 2021

(30) Foreign Application Priority Data
Sep. 21, 2018 (KR) .................. 10-2018-0114408

(51) Int. Cl.
*H01M 50/264* (2021.01)
*H01M 50/20* (2021.01)
(Continued)

(52) U.S. Cl.
CPC ......... *H01M 50/264* (2021.01); *H01M 50/20* (2021.01); *H01M 50/224* (2021.01);
(Continued)

(58) Field of Classification Search
None
See application file for complete search history.

(56) References Cited

U.S. PATENT DOCUMENTS 8,592,069 B1 * 11/2013 Anderson ............ H01M 50/20
429/97
2007/0170323 A1 7/2007 Boville
(Continued)

FOREIGN PATENT DOCUMENTS

| CN | 102067352 A | 5/2011 |
| CN | 103165835 A | 6/2013 |

(Continued)

OTHER PUBLICATIONS

International Search Report for Application No. PCT/KR2019/010705 dated Dec. 9, 2019, 2 pages.
(Continued)

*Primary Examiner* — Gregg Cantelmo
(74) *Attorney, Agent, or Firm* — Lerner, David, Littenberg, Krumholz & Mentlik, LLP

(57) ABSTRACT

A battery package including a fixing member, a device including the same, and a battery package manufacturing method are provided. The battery package includes: a battery module including a plurality of battery cells; a tray disposed at a lower end of the battery module and receiving the battery module; and a bracket adjacent to one side of the tray and mounted and coupled to one side surface of the lower end of the battery module, wherein at least one of a surface of the bracket in contact with the battery module and a surface of the tray in contact with the one side surface of the lower end of the battery module and disposed adjacent to the bracket may have a wedge shape.

11 Claims, 5 Drawing Sheets

(51) Int. Cl.
*H01M 50/244* (2021.01)
*H01M 50/224* (2021.01)
*H01M 50/242* (2021.01)

(52) U.S. Cl.
CPC ....... *H01M 50/242* (2021.01); *H01M 50/244* (2021.01); *H01M 2220/20* (2013.01)

(56) References Cited

U.S. PATENT DOCUMENTS

| | | | |
|---|---|---|---|
| 2009/0325049 A1 | 12/2009 | Niedzwiecki et al. | |
| 2013/0309560 A1* | 11/2013 | Lent .................... | H01M 50/20 429/186 |
| 2014/0158444 A1 | 6/2014 | Han et al. | |
| 2015/0280183 A1 | 10/2015 | Utley et al. | |
| 2017/0047563 A1* | 2/2017 | Lee .................... | H01M 50/502 |
| 2017/0200924 A1 | 7/2017 | Kang | |
| 2018/0269441 A1* | 9/2018 | Yum ................ | H01M 10/6554 |

FOREIGN PATENT DOCUMENTS

| | | |
|---|---|---|
| CN | 103723020 A | 4/2014 |
| CN | 104321903 A | 1/2015 |
| CN | 104953154 A | 9/2015 |
| CN | 105098112 A | 11/2015 |
| DE | 102011077330 A1 | 12/2012 |
| EP | 2736745 B1 | 5/2017 |
| JP | 2002225570 A | 8/2002 |
| JP | 2003237381 A | 8/2003 |
| JP | 2012084239 A | 4/2012 |
| JP | 2014063747 A | 4/2014 |
| JP | 2015518998 A | 7/2015 |
| JP | 2016184470 A | 10/2016 |
| JP | 2017515266 A | 6/2017 |
| JP | 2018049697 A | 3/2018 |
| KR | 20050119660 A | 12/2005 |
| KR | 20130129833 A | 11/2013 |
| KR | 101425569 B1 | 8/2014 |
| KR | 20150127357 A | 11/2015 |
| KR | 101712283 B1 | 3/2017 |
| KR | 101764057 B1 | 8/2017 |
| KR | 20170098583 A | 8/2017 |

OTHER PUBLICATIONS

Extended European Search Report including Written Opinion for Application No. 19863853.8 dated May 11, 2021, pp. 1-6.
Search Report dated Mar. 24, 2022 from Office Action for Chinese Application No. 201980015544.6 dated Apr. 2, 2022. 3 pgs. (see p. 1, categorizing the cited references).

* cited by examiner

BATTERY PACKAGE INCLUDING FIXING MEMBER, A DEVICE INCLUDING THE SAME AND MANUFACTURING METHOD OF BATTERY PACKAGE

CROSS-REFERENCE TO RELATED APPLICATIONS

The present application is a national phase entry under 35 U.S.C. § 371 of International Application No. PCT/KR2019/010705, filed Aug. 22, 2019, published in Korean, which claims the benefit of the priority of Korean Patent Application No. 10-2018-0114408, filed on Sep. 21, 2018, which are hereby incorporated by reference in their entireties.

TECHNICAL FIELD

The present invention relates to a battery package, a device including the same, and a manufacturing method of a battery package, and in detail, to a battery package battery including a fixing member to increase a fixing force when fixing a battery module in a package, a device including the same, and a manufacturing method of a battery package.

BACKGROUND ART

In modern society, in accordance with the daily use of portable devices such as a mobile phone, a laptop computer, a camcorder, a digital camera, and the like, technologies of a field related to the portable devices have been actively developed. In addition, as a secondary battery capable of being charged and discharged is used as a power source of an electric vehicle (EV), a hybrid electric vehicle (HEV), and a plug-in hybrid electric vehicle (P-HEV) as a method for solving air pollution of conventional gasoline vehicles using a fossil fuel, a necessity for the development of the secondary battery is increasing.

In the case of a secondary battery used in small devices, two or three battery cells are arranged, and in the case of a secondary battery used in a medium and large device such as automobiles, a battery module in which a plurality of battery cells are electrically connected is used.

In order to increase efficiency of a device using the secondary battery, it is preferable to use a secondary battery having a large capacity while having a small size and a low weight, and accordingly, rectangular batteries, pouch-type batteries, and the like, which are integrated with high integration and have a small weight to capacity, are mainly used.

In particular, in the case of a battery module used in a medium-large device, in order to provide capacity above a specific value required by the device, a plurality of battery cells are electrically connected in series, and in this case, stability of the secondary battery itself varies depending on a method of connecting and fixing a plurality of battery cells.

In general, as a method of fixing the battery module inside the battery pack, a method of directly fixing the battery module by using a bolt after stacking a plurality of battery cells is mainly used.

FIG. 1 is a diagram illustrating a battery module fixing structure using bolts as a conventionally used method.

As shown in FIG. 1, there is a method of using a bolt as the conventional fixing method of the battery module, and in this case, the bolt is fastened to the side surface of the lower part of the battery module to fix the battery module to a tray or a lower case of the battery pack. However, since the thickness of the part to which the bolt is fastened, which plays a role of fixing, is small, and the fixing force is low, there is a problem that it is difficult to match the dimensional safety in the fastening structure, and thus there is a problem that the stability of the battery module may not be maintained.

When it is difficult to directly fix the battery module as shown in FIG. 1, there is a method fixing the battery module to the battery package by using a bracket. This is to arrange the battery module and the bracket to be overlapped, and to fix using the generated reaction force.

However, in the case of fixing using the conventional bracket, there is a problem that it is difficult to increase the fixing force of the battery module against vibration and impact applied to the battery module, the stability of the battery module is deteriorated when a load above a certain value is received.

In the present invention, to improve the above problems, in the fixing of the battery module, it is necessary to develop the battery pack including a fixing member to increase stability, compared to the conventional battery module fixing method.

DISCLOSURE

Technical Problem

Embodiments of the present invention have been proposed to solve the above problems of the conventionally proposed methods by providing a battery pack including a fixing member, a device including the same, and a manufacturing method of the battery pack for stably fixing the battery module against the vibration, impact, etc. applied to the battery module by processing the surface of the member for fixing the battery module to increase the fixing force.

However, the problems to be solved by exemplary embodiments of the present invention are not limited to the problems described above, and may be variously expanded within the technical spirit of the present invention.

Technical Solution

A battery package including a fixing member according to a feature of the present invention includes: a battery module including a plurality of battery cells; a tray disposed at a lower end of the battery module and receiving the battery module; and a bracket adjacent to one side of the tray and mounted and coupled to one side surface of the lower end of the battery module, wherein at least one of a surface of the bracket in contact with the battery module and a surface of the tray in contact with the one side surface of the lower end of the battery module and disposed adjacent to the bracket has a wedge shape.

A rigidity of the bracket and a rigidity of the tray both may be higher than a rigidity of the battery module.

The bracket may be formed of a type of steel.

The tray may be formed of a type of steel.

The bracket may be a hold-down bracket.

In a state in which the battery module is mounted to the tray, an upper case disposed at an upper end of the battery module and enclosing the battery module may be further included.

A concave shape may be formed along a processed shape of the bracket and the tray at a surface of the battery module in contact with the surface of the bracket and the surface of the tray.

A battery package manufacturing method may include, in a battery package including a battery module, a tray disposed at a lower end of the battery module and receiving the battery module, and a bracket adjacent to one side of the tray and mounted and coupled to one side surface of the lower end of the battery module: a step of processing at least one of a surface of the bracket and a surface of the tray to form a wedge shape; and a step of disposing a processed part of the bracket and the tray to be adjacent to the one side surface of the lower end of the battery module and pressing the processed part toward the battery module.

A step of forming a concave shape according to a processed shape of the bracket and the tray in a surface of the battery module in contact with the processed part of the bracket and the tray may be further included.

A rigidity of the bracket and a rigidity of the tray both may be higher than a rigidity of the battery module.

The bracket may be formed of a type of steel.

The tray may be formed of a type of steel.

Also, a device according to another aspect of the present invention for achieving the above objects may include a battery package, as a power source, including: a battery module including a plurality of battery cells; a tray disposed at a lower end of the battery module and receiving the battery module; and a bracket adjacent to one side of the tray and mounted and coupled to one side surface of the lower end of the battery module, wherein at least one of the surface of the bracket in contact with the battery module and the surface of the tray in contact with one side surface of the lower end of the battery module and disposed adjacent to the bracket has a wedge shape.

Advantageous Effects

According to exemplary embodiments of the present invention, by processing the surface of the fixing member used when fixing the battery module to increase a surface friction force between contact surfaces, a fixing force of the battery module may be increased, and the battery module may be stably fixed against vibrations and impacts.

MODE FOR INVENTION

Figure 1:
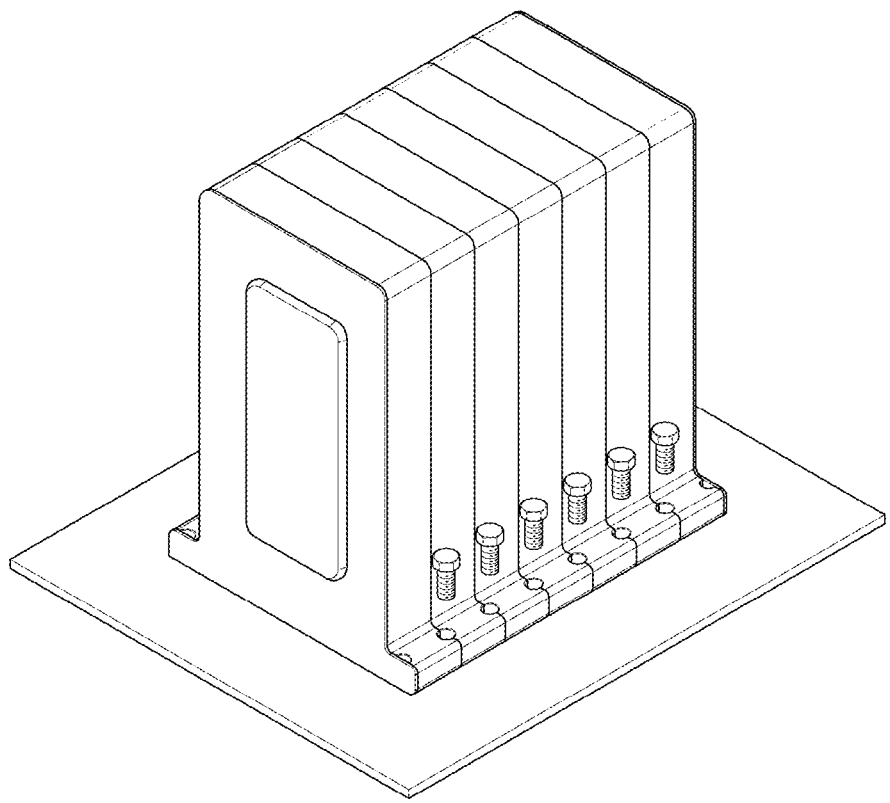
FIG. 1 is a diagram showing a battery module fixing structure using a bolt as a conventionally used method.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain the present invention, portions that are not directly related to the present invention are omitted, and the same reference numerals are attached to the same or similar constituent elements through the entire specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

In the present invention, in order to solve the problem in the conventional battery module fixing method, the area of the portion that serves to fix the battery module is increased to enhance the fixing force, and the surface of the widened area is processed in order to prevent the battery module from shaking and falling off against the vibration and impact in all directions toward the battery module to increase the frictional force. This is described in more detail through FIG. 2 to FIG. 5 below.

Figure 2:
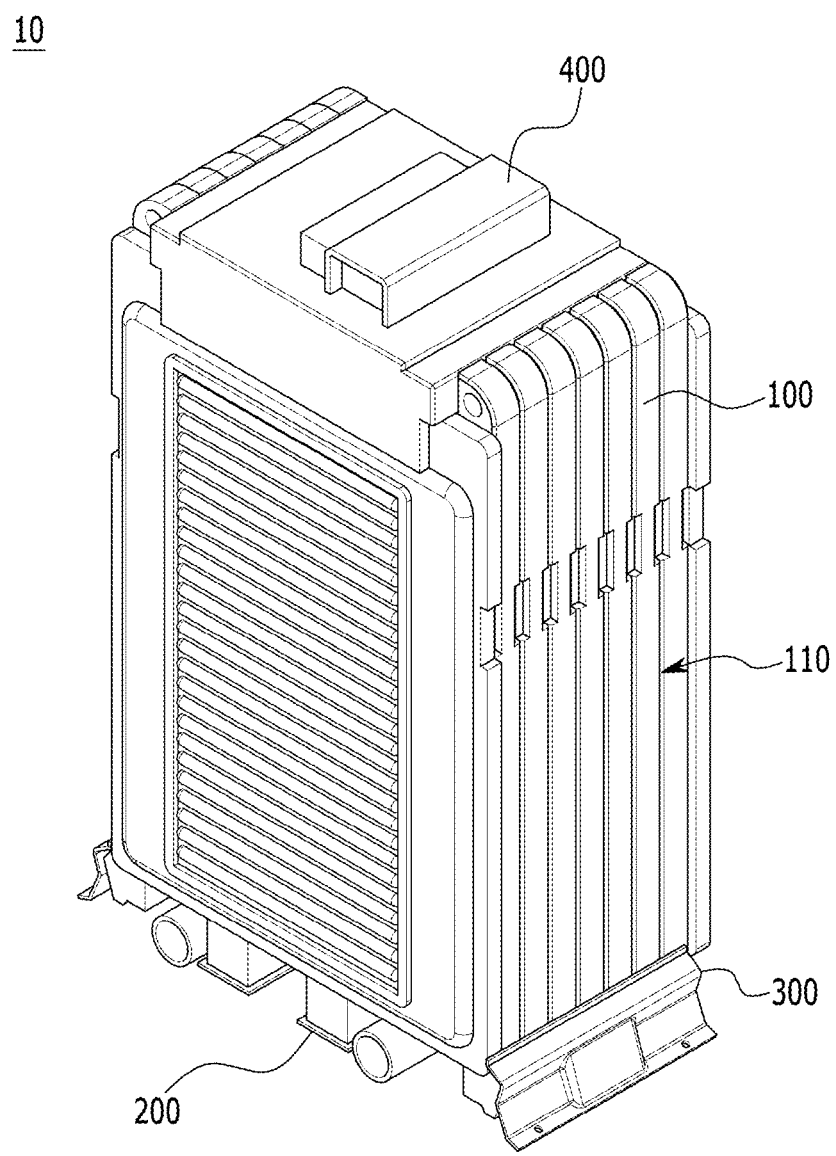
FIG. 2 is a view showing a battery package including a fixing member according to an exemplary embodiment of the present invention.

FIG. 2 is a view showing a battery package including a fixing member according to an exemplary embodiment of the present invention.

FIG. 2 shows a shape in which a tray 200 and a bracket 300 as a part of a configuration of a battery package 10 are coupled to a battery module 110, and as shown in FIG. 2, the battery package 10 including the fixing member according to an exemplary embodiment of the present invention may include the battery module 110 including a plurality of battery cells 100, the tray 200 disposed at the lower end of the battery module 110 and receiving the battery module 110, and the bracket 300 adjacent to one side of the tray 200 and mounted and coupled to the one side surface of the lower end of the battery module 110.

In a state in which the battery module 110 is mounted on the tray 200, the battery module 110 may further include an upper case 400 disposed at the upper end of the battery module 110 and surrounding the battery module 110, the bracket 300 may be a hold-down bracket, and the battery cells 100 as plate-shaped battery cells may be connected in a series manner.

Particularly, in the present invention, at least one of the surface of the bracket 300 in contact with the battery module 110 and the surface of the tray 200 in contact with one side surface of the lower end of the battery module 110 and disposed adjacent to the bracket 300 is processed, and when the bracket 300 and the tray 200 are coupled to the battery module 110 to fix the battery module 110, a friction force is generated in the processed portion by pressure, thereby it is a feature of the present invention to be able to enhance the mutual fixing force.

Figure 3:
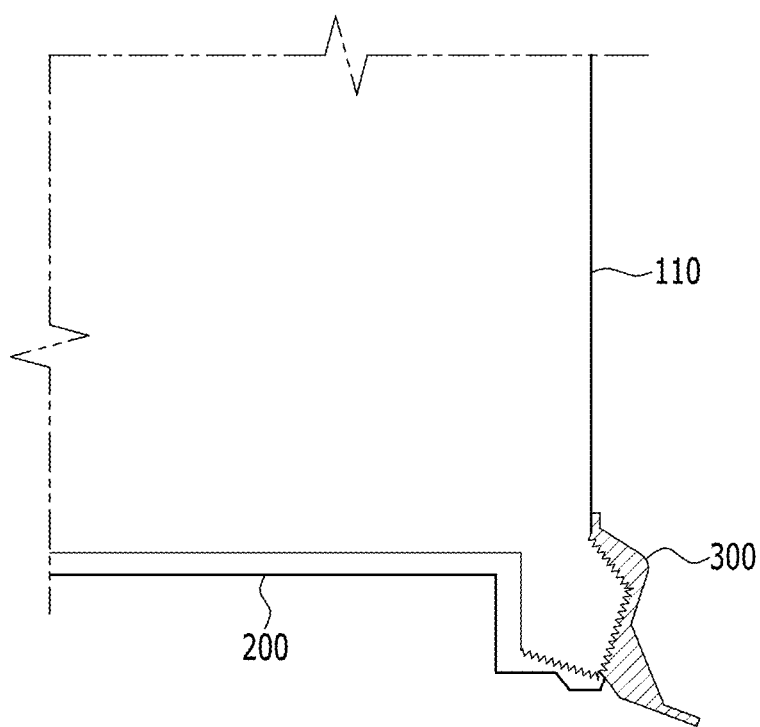
FIG. 3 is a view showing a cross-section of a battery package including a fixing member according to an exemplary embodiment of the present invention.

FIG. 3 is a view showing a cross-section of a battery package including a fixing member according to an exemplary embodiment of the present invention.

From the cross-sectional surface of the battery pack 10 including the fixing member according to the present exemplary embodiment shown in FIG. 3, it may be confirmed that the part of the tray 200 in contact with the battery module 110 and the surface of the bracket 300 are processed and the processed part has a wedge shape.

Specifically, FIG. 3 is the view illustrating a state in which the bracket 300 and the tray 200 are pressed and fixed to the battery module 110, when the bracket 300 and the tray 200 are pressed, it may be confirmed that the concave shape is formed according to the processed shape of the bracket 300 and the tray 200, that is, the wedge shape on the surface of the battery module 110 in contact with the wedge-shaped surface portion of the bracket 300 and the tray 200.

Figure 4:
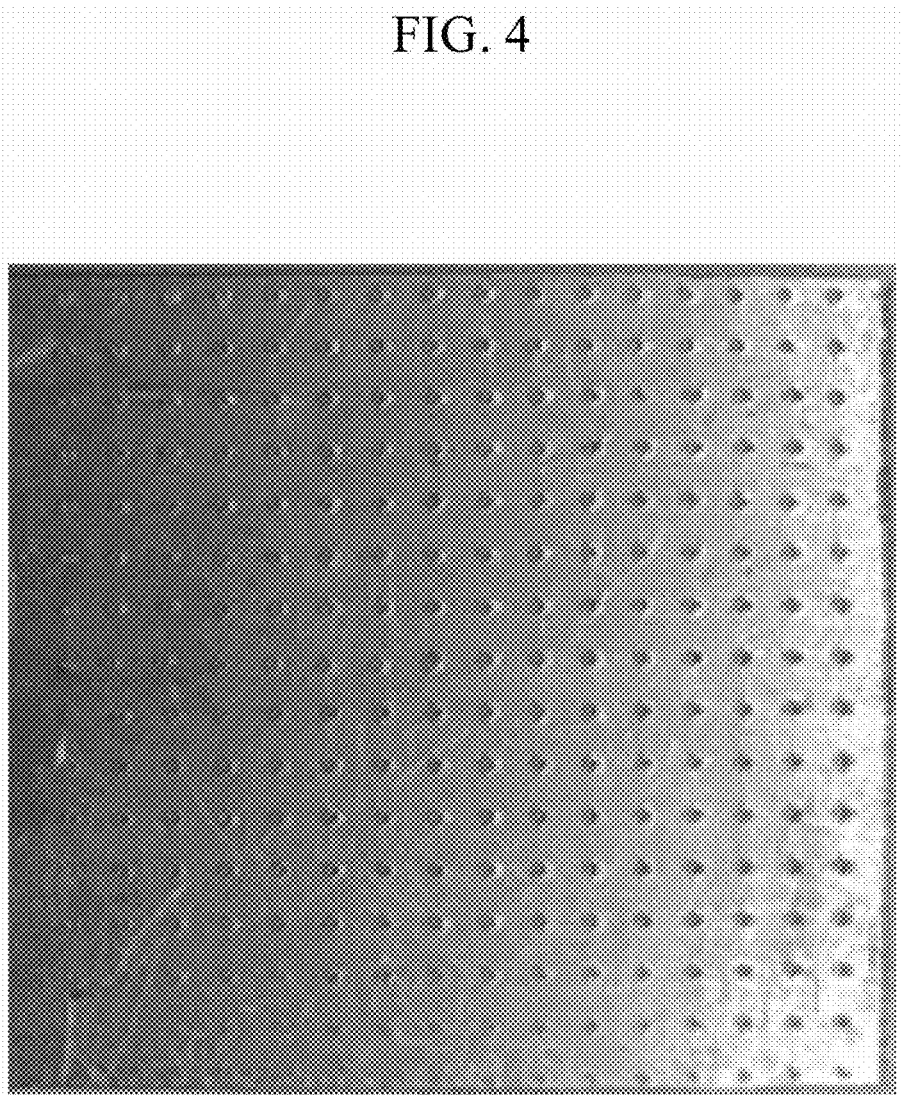
FIG. 4 is a view to explain a shape of a processed surface in a battery package including a fixing member according to an exemplary embodiment of the present invention.

FIG. 4 is a view to explain a shape of a processed surface in a battery package including a fixing member according to an exemplary embodiment of the present invention.

That is, FIG. 4 shows the wedge shape formed on the surface of the bracket 300 or the tray 200, and a plurality of wedge shapes as shown in FIG. 4 may be formed on the processed surface of the bracket 300 and the tray 200 in the present invention. That is, the surface of the bracket 300 and the tray 200 may include the shape such as a wedge grip. However, the shape of the processed surface of the bracket 300 and the tray 200 is not limited to this, and may be any shape that may increase the friction force in the contact surface.

Figure 5:
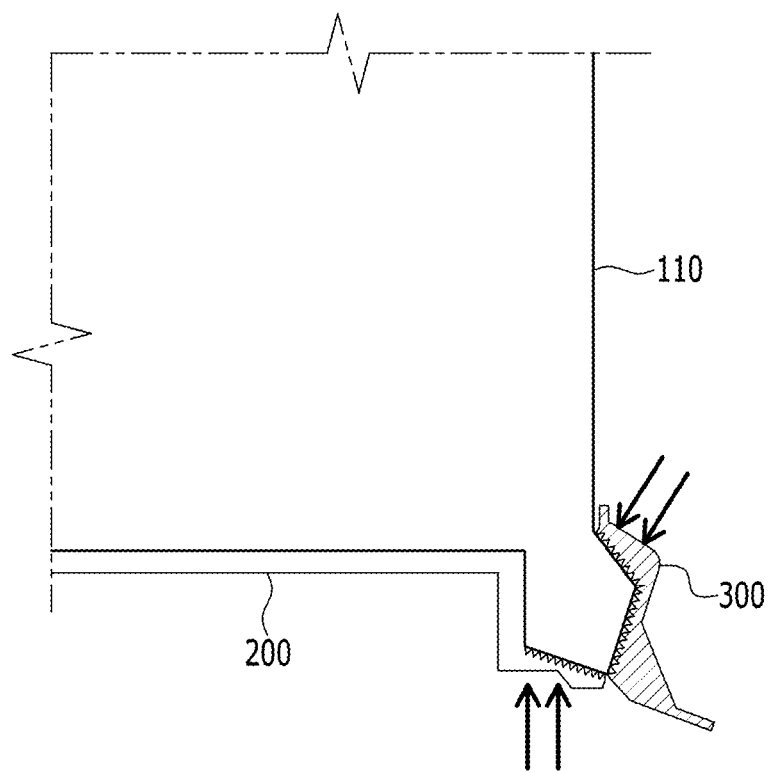
FIG. 5 is a view to explain a pressure applied to a bracket in a battery package including a fixing member according to an exemplary embodiment of the present invention.

FIG. 5 is a view to explain a pressure applied to a bracket in a battery package including a fixing member according to an exemplary embodiment of the present invention.

According to the present exemplary embodiment, the bracket 300 and the tray 200 are respectively mounted to the side surface and the lower surface at one side surface of the lower end of the battery module 110, as shown in FIG. 5, and as the surface where the battery module 110 and the bracket 300 are in contact and the surface where the tray 200 of the position adjacent to the bracket 300 is in contact with the lower part of the battery module 110, a protrusion is formed at each surface of the bracket 300 and the tray 200, and the pressure may be applied from the outside for each surface. In the present invention, by applying the pressure to the battery module 110 in a direction perpendicular to the surface of the bracket 300 and the tray 200 of which the surface is processed in this way, it is possible to increase the fixing force to the battery module 110.

Specifically, the bracket 300 and the tray 200 are made of a type of steel, and the outer surface of the battery module 110 including the battery cells may be formed of a plastic, and in this case, the rigidity of the bracket 300 and the tray 200 becomes higher than the rigidity on the surface of the battery module 110. Thus, by the pressure as shown in FIG. 5, while the processed wedge shape of the surface of the bracket 300 and the surface of the tray 200 having high rigidity presses the surface of the battery module 110 having relatively low rigidity, the surface as shown in FIG. 4 is engraved in the surface of the battery module 110.

As such, while the protruding and recessed shapes are inscribed between the pressing and pressed components, slippage may be prevented between the components, and the frictional force is generated to enhance the fixing force. In particular, it is possible to maintain the high fixing force against the vibration and the impact applied in all directions, not just the vibration and the impact applied to the battery module 110 in a specific direction.

The manufacturing method of the battery package according to an exemplary embodiment of the present invention, in the battery package including the battery module, the tray disposed at the lower end of the battery module and receiving the battery module and the bracket adjacent to one side of the tray and mounted and coupled to one side surface of the lower end of the battery module, may include a step S100 of processing at least one of the surface of the bracket and the surface of the tray to form the wedge shape and a step S200 of disposing the processed part of the bracket and the tray to be adjacent to one side surface of the lower end of the battery module and pressing it toward the battery module.

According to an exemplary embodiment, a step S300 of forming a concave shape according to the processed shape of the bracket and the tray in the surface of the battery module in contact with the processed surface portion of the bracket and the tray may be further included.

When mutually fixing the bracket 300 and the tray 200 by pressing the bracket 300 and the tray 200 to the battery module 110 to form the shape in the battery module 110, the fixing force is strengthened by the mutual frictional force. In this case, the rigidity of the bracket 300 and the tray 200 may include a fixing member that is higher in rigidity than the rigidity of the battery module 110, and according to an exemplary embodiment, the bracket 300 and the tray 200 may be formed of a type of steel, while the surface of the battery module 110 may be formed of a plastic material.

Also, a device according to an exemplary embodiment of the present invention may include a battery package 10, as a power source, including the battery module 110 including a plurality of battery cells 100, the tray 200 disposed at the lower end of the battery module 110 and receiving the battery module 110, and the bracket 300 adjacent to one side of the tray 200 and mounted and coupled to one side surface of the lower end of the battery module 110, wherein at least one of the surface of the bracket 300 in contact with the battery module 110 and the surface of the tray 200 in contact with one side surface of the lower end of the battery module 110 and disposed adjacent to the bracket 300 has the wedge shape.

The device may be an electric vehicle, a hybrid electric vehicle, or a plug-in hybrid electric vehicle, but is not limited thereto.

As above-described, the present invention is the battery package including the fixing member, in order to solve a problem that the fixing force of the battery module is low and the battery module moves when receiving a load higher than a certain value in the conventional battery module fixing method using the bolt, and in addition, in the conventional method using a general bracket, in order to solve a problem that the stability of the battery module is inevitably low against the vibration, impact, etc. applied to the battery module, by processing the member fixing the battery module, it is meaningful in that the battery module may be stably fixed by increasing the fixing force of the battery module from the vibration and impact in all directions.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

10: battery package
100: battery cell

110: battery module
200: tray
300: bracket
400: upper case

The invention claimed is:

1. A battery package including a fixing member comprising:
   a battery module including a plurality of battery cells;
   a tray disposed at a lower end of the battery module and receiving the battery module; and
   a bracket adjacent to one side of the tray and mounted and coupled to one side surface of the lower end of the battery module,
   wherein a surface of the bracket in contact with the battery module has a wedge shape,
   wherein a surface of the tray in contact with the one side surface of the lower end of the battery module and disposed adjacent to the bracket has a wedge shape, and
   wherein a concave shape is formed along a processed shape of the bracket and along a processed shape of the tray at a surface of the battery module in contact with the surface of the bracket and the surface of the tray.

2. The battery package including the fixing member of claim 1, wherein
   a rigidity of the bracket and a rigidity of the tray both are higher than a rigidity of the battery module.

3. The battery package including the fixing member of claim 2, wherein
   the bracket is formed of a type of steel.

4. The battery package including the fixing member of claim 2, wherein
   the tray is formed of a type of steel.

5. The battery package including the fixing member of claim 1, wherein
   the bracket is a hold-down bracket.

6. The battery package including the fixing member of claim 1, further comprising,
   in a state in which the battery module is mounted to the tray, an upper case disposed at an upper end of the battery module and enclosing the battery module.

7. A device comprising the battery package of claim 1 as a power source.

8. A battery package manufacturing method comprising, in a battery package including a battery module, a tray disposed at a lower end of the battery module and receiving the battery module, and a bracket adjacent to one side of the tray and mounted and coupled to one side surface of the lower end of the battery module:
   a step of processing a surface of the bracket to form a wedge shape;
   a step of processing a surface of the tray to form a wedge shape;
   a step of forming a concave shape along a processed shape of the bracket and along a processed shape of the tray in a surface of the battery module in contact with the processed part of the bracket and the tray; and
   a step of disposing a processed part of the bracket and the tray to be adjacent to the one side surface of the lower end of the battery module and pressing the processed part toward the battery module.

9. The battery package manufacturing method of claim 8, wherein
   a rigidity of the bracket and a rigidity of the tray both are higher than a rigidity of the battery module.

10. The battery package manufacturing method of claim 9, wherein
    the bracket is formed of a type of steel.

11. The battery package manufacturing method of claim 9, wherein
    the tray is formed of a type of steel.

* * * * *